US009849985B2

(12) United States Patent
Mayer

(10) Patent No.: US 9,849,985 B2
(45) Date of Patent: Dec. 26, 2017

(54) FOLDABLE DIVIDER DEVICE FOR AN AIRCRAFT CABIN

(71) Applicant: Airbus Operations GmbH, Hamburg (DE)

(72) Inventor: Tobias Mayer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 84 days.

(21) Appl. No.: 14/677,447

(22) Filed: Apr. 2, 2015

(65) Prior Publication Data

US 2015/0284084 A1 Oct. 8, 2015

(30) Foreign Application Priority Data

Apr. 4, 2014 (EP) ..................................... 14163607

(51) Int. Cl.
B64D 11/00 (2006.01)
(52) U.S. Cl.
CPC ................................ B64D 11/0023 (2013.01)
(58) Field of Classification Search
CPC ................................................. B64D 11/0023
See application file for complete search history.

(56) References Cited

U.S. PATENT DOCUMENTS

| 3,423,121 | A | * | 1/1969 | Lipkin | .................... | B60R 21/06 |
| | | | | | | 160/229.1 |
| 4,185,799 | A | | 1/1980 | Richards, Jr. | | |
| 4,597,549 | A | * | 7/1986 | Ryan | ......................... | B64C 1/10 |
| | | | | | | 160/127 |
| 4,899,962 | A | | 2/1990 | Mueller | | |
| 5,165,626 | A | * | 11/1992 | Ringger | ............. | B64D 11/0023 |
| | | | | | | 16/282 |
| 5,393,013 | A | | 2/1995 | Schneider | | |
| 5,577,358 | A | | 11/1996 | Franke | | |
| 5,816,534 | A | | 10/1998 | Schumacher | | |
| 6,257,523 | B1 | * | 7/2001 | Olliges | ................ | B61D 17/048 |
| | | | | | | 160/210 |
| 8,613,407 | B2 | | 12/2013 | Hartel | | |
| 8,869,865 | B2 | * | 10/2014 | Roach | ................ | B64D 11/0023 |
| | | | | | | 160/84.04 |

(Continued)

FOREIGN PATENT DOCUMENTS

DE 4014057 C1 10/1991
DE 10 2008 031 021 A1 1/2010

(Continued)

OTHER PUBLICATIONS

Extended European Search Report for Application No. 14163612.6 dated Oct. 9, 2014.

(Continued)

*Primary Examiner* — Philip J Bonzell
(74) *Attorney, Agent, or Firm* — Jenkins, Wilson, Taylor & Hunt, P.A.

(57) ABSTRACT

A divider device for an aircraft cabin including elongate bar elements, each planar and flexible to assume a linear state extending rectilinearly along a longitudinal axis parallel to a plane, each bar element curved in a first stable state, to deform into its first stable state when bent towards the stable state to a predetermined extent, the bar elements arranged side-by-side and adjacent bar elements are pivotably interconnected with each other.

10 Claims, 4 Drawing Sheets

(56) References Cited

U.S. PATENT DOCUMENTS

| | | |
|---|---|---|
| 9,073,640 B2 | 7/2015 | Mosler |
| 9,120,573 B2 | 9/2015 | Ehlers |
| 9,227,728 B2 | 1/2016 | Schimanowski |
| 2003/0127562 A1 | 7/2003 | Pereira |
| 2009/0224103 A1 | 9/2009 | Neumann |
| 2011/0114788 A1 | 5/2011 | Mosler |
| 2012/0043028 A1 | 2/2012 | Roach |
| 2013/0082140 A1 | 4/2013 | Ehlers |
| 2014/0217239 A1 | 8/2014 | Ehlers |
| 2015/0284082 A1 | 10/2015 | Mayer et al. |
| 2015/0284083 A1 | 10/2015 | Mayer |
| 2016/0115721 A1* | 4/2016 | Leadens, II .............. E06B 9/362 244/129.5 |

FOREIGN PATENT DOCUMENTS

| | | |
|---|---|---|
| DE | 10 2011 109 390 A1 | 2/2013 |
| EP | 0754621 A1 | 1/1997 |
| EP | 0850833 A2 | 7/1998 |
| EP | 0708018 B1 | 8/1998 |
| EP | 1118537 A2 | 7/2001 |
| EP | 1125520 A1 | 8/2001 |
| GB | 903956 A | 8/1962 |
| WO | WO-2010/084048 A1 | 7/2010 |

OTHER PUBLICATIONS

Extended European Search Report for Application No. 14163618 dated Sep. 17, 2014.

Extended European Search Report for Application No. 1416 3607.6 dated Nov. 14, 2014.

Notice of Allowance for U.S. Appl. No. 14/677,414 dated Apr. 18, 2017.

Non-Final Office Action for U.S. Appl. No. 14/677,414 dated Oct. 26, 2016.

Non-Final Office Action for U.S. Appl. No. 14/677,424 dated Jan. 6, 2017.

* cited by examiner

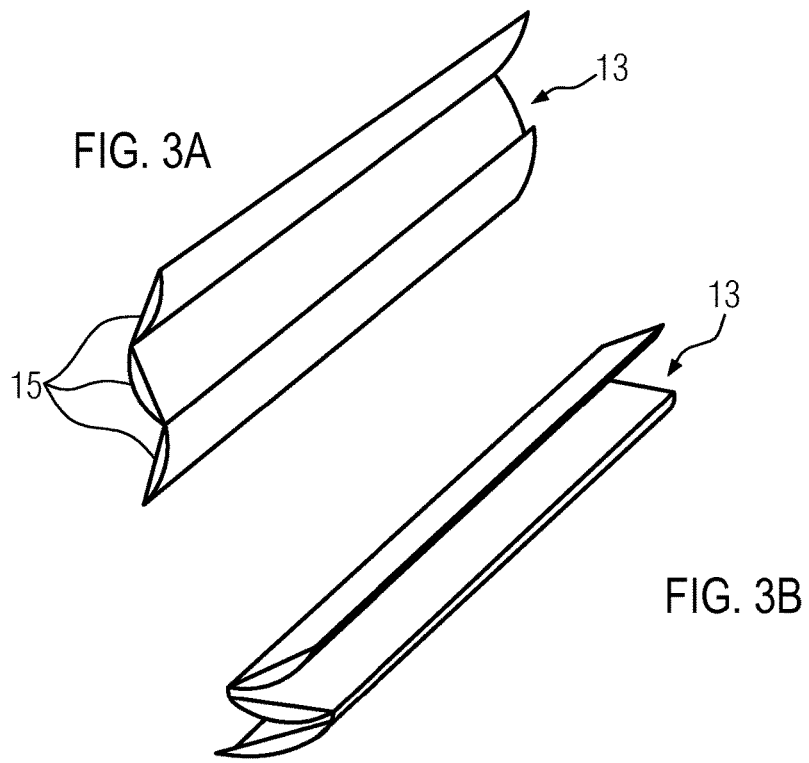
FIG. 3A
FIG. 3B
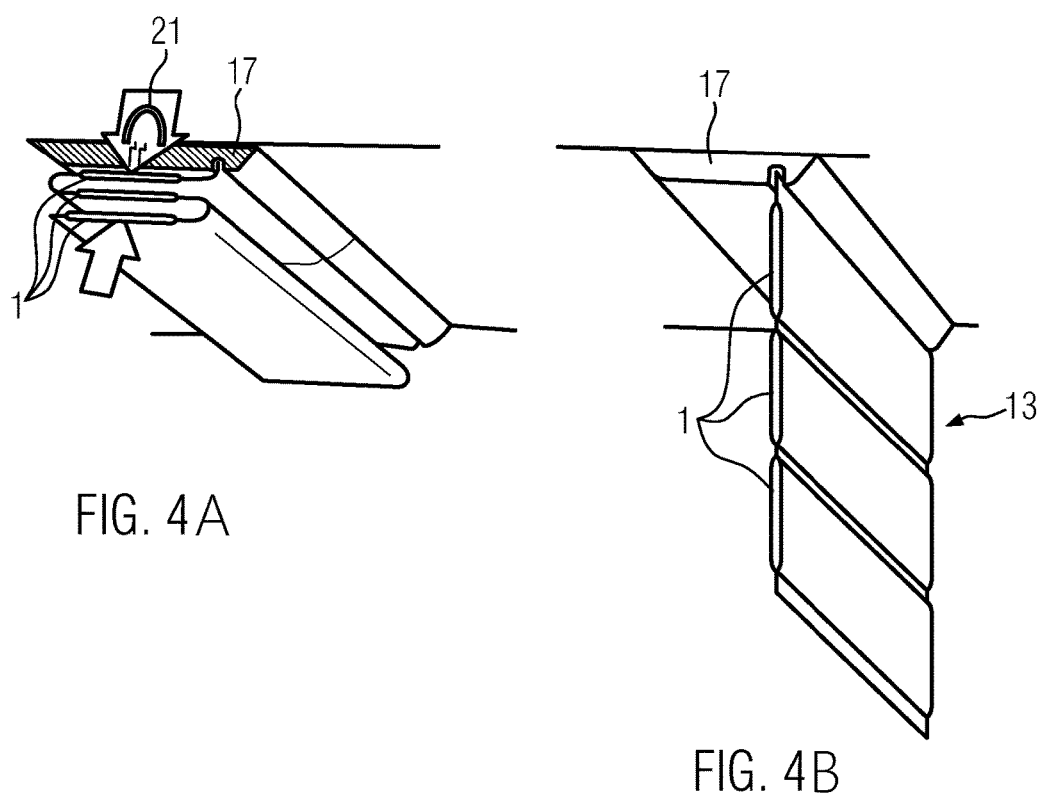
FIG. 4A
FIG. 4B

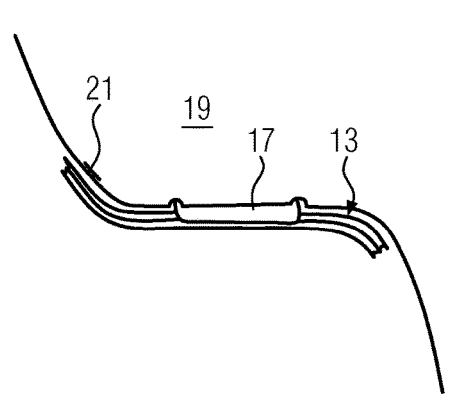
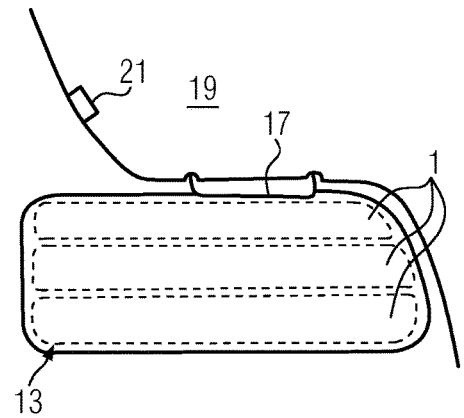
FIG. 5A                FIG. 5B
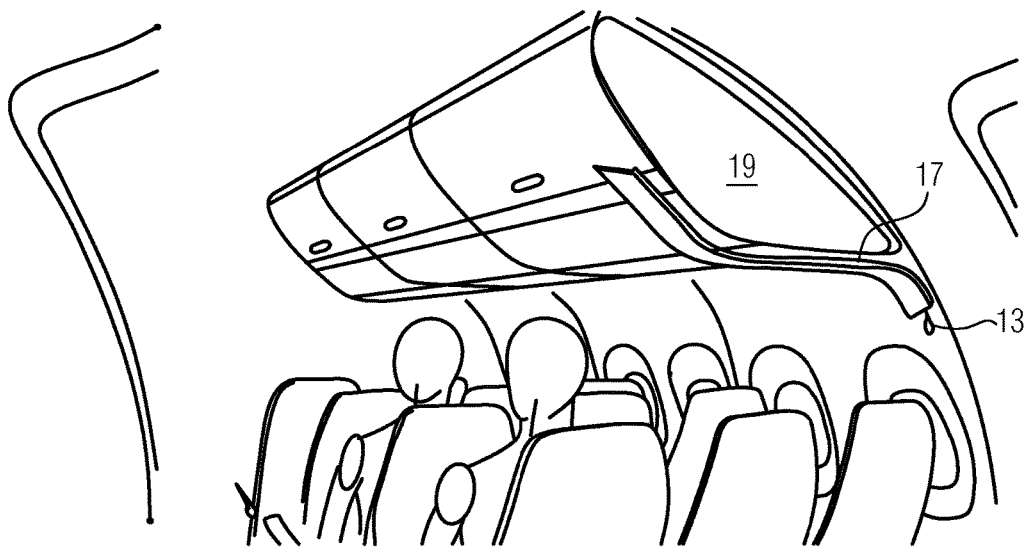
FIG. 6

FOLDABLE DIVIDER DEVICE FOR AN AIRCRAFT CABIN

CROSS-REFERENCE TO RELATED APPLICATION

This application claims priority to European Patent Application No. 14163607.6 filed Apr. 4, 2014, the entire disclosure of which is incorporated by reference herein.

TECHNICAL FIELD

The present disclosure relates to a divider device for an aircraft cabin.

BACKGROUND

Aircraft cabin arrangements usually comprise a plurality of seat rows which are arranged perpendicularly to a longitudinal axis of the cabin and in parallel one after another. Further, the cabin arrangement comprises different sections such as a business class and an economy class, and it is desirable to provide elements to visually separate the different sections from each other to prevent passengers from looking from one section to the other.

However, during take off and landing the cabin crew needs a free view through the entire cabin. Thus, elements which prevent such a view need to be brought in a state so that they do not impede a view through the cabin. Here, it is known to employ curtains on a guide rail as separation elements. However, curtain arrangements are rather complicated to handle, and it is time consuming and cumbersome to shift the curtain from the expanded to the retracted position and to fix it in the latter.

Further, from EP 0 754 621 A1 a divider assembly is known comprising separate elements slidably supported in a guide rail extending perpendicularly to the longitudinal axis of the cabin along the ceiling portion.

SUMMARY

Therefore, it is an object of the present disclosure to provide a divider device which can easily be handled and changed between an expanded state and a collapsed state.

This object is achieved by a divider device for an aircraft cabin comprising a plurality of elongate bar elements, wherein each bar element is planar and flexible so that it may assume a linear state in which it extends rectilinearly along a longitudinal axis parallel to a plane, wherein each bar element has a first stable state in which it is curved, so that it deforms into its first stable state when being bent out of the linear state towards the first stable state to a predetermined extent, wherein the bar elements are arranged side-by-side and adjacent bar elements are pivotably interconnected with each other, so that when the bar elements are in the linear state, their longitudinal axes extend in parallel, and wherein each pair of first and second adjacent bar elements are designed such that when the first and the second bar elements are in the linear state and extend in a common plane, in the first stable state of the first bar element one end thereof is positioned on a first side of the plane whereas in the first stable state of the second bar element its end corresponding to the end of the first bar element is located on a second side of the plane opposite the first side.

Thus, the divider device comprises a plurality of bar elements which are configured such that they have at least a first stable state in which the bar elements are curved, in particular S-shaped rather than extending rectilinearly, i.e. along a straight line, in a plane. When these bar elements are bent from a linear state in which they have a rectilinear shape, towards the first stable state to a predetermined extent, the bar elements will automatically fully transform into the curved shape of the first stable state. However, it is also conceivable that the bar elements will directly transform their shape to the shape of the first stable state when the bar elements are not fixed in the linear state.

Such a configuration can easily be achieved by using a flexible material for the bar elements such as spring steel, wherein the respective bar elements have been rolled such that they have a curved shape when no force is applied to the bar elements. Then, this curved shape corresponds to the first stable state into which the bar elements return when they are released after being bent into a shape where they extend rectilinearly in a plane. In such a case the bending from the linear state towards the first stable state occurs automatically, when the bar elements are no longer fixed and released from the linear state.

In the device according to the present disclosure such bar elements are arranged side-by-side and are pivotably connected with each other wherein for each pair of adjacent bar elements the configuration is such that when both of these bar elements are in the linear shape and arranged in a common plane, in the first stable state an end of the first bar element would be located on one side of that plane whereas the corresponding end of the second bar element of that pair would be located on the other side of the plane. This means that adjacent bar elements tend to bend to opposite sides of a plane when each of the bar elements of the device is entirely positioned in the common plane.

In such a situation which occurs when the divider device is suspended from a support element such as a hatrack portion, the respective forces which tend to bent the bar elements into the first stable state, i.e. the curved shape, are cancelled out due to the afore-mentioned arrangement of adjacent bar elements tending to bend alternately to opposite directions. Thus, the entire divider element remains in a flat vertical configuration.

However, when the bar elements are folded on top of each other, the resulting stack of bar elements tends to bend to the same side of a plane parallel to which the bar elements extend when being in the linear state. As in this situation, the forces are not cancelled out, the stack will indeed assume such a curved shape. Due this curved shape the stack cannot easily be unfolded without an external force as the connecting lines forming a hinge between adjacent bar elements, are no longer straight.

Thus, if the divider device of the present disclosure is folded from a straight vertical position into a stack, this stack will automatically assume a curved shape and remains in the folded state unless an external force is applied which bends the entire stack into a linear shape.

Therefore, the divider device is easy to handle, since the cabin crew has only to the bend the stack of interconnected bar elements into a linear shape to obtain the expanded vertical position of the divider in which it is effective as screening element. In turn, to achieve the collapsed state, it is only required to fold the bars on top of each other towards the support element of the divider device such as the respective hatrack portion. In this regard, it is advantageous when the shape of the first stable state of the bar elements corresponds to the shape of the cross section of the hatrack. Here, an S-shape is preferred. In this case the entire stack of bar elements follows the shape of the hatrack when the divider device is in the collapsed state.

In a preferred embodiment, the bar elements are configured such that the linear state of the bar elements forms a second stable state so that when one of the bar elements is bent out of the linear state to an extent smaller than the predetermined extent, it returns back to the linear state. This has the advantage, that also the flat vertical configuration of the divider device, i.e. the expanded state, is a stable position of the device and an external force is required to bring the bar elements into the first stable state in which they are curved.

Further, it preferred that the divider device comprises bar elements having first and second planar members which are arranged on top of each other. This allows to easily obtain first and second stable states of the entire bar elements. The first planar member is configured such that it defines the first stable state whereas the second planar member is in a stable state when the entire bar element has a flat rectilinear shape.

In particular, the first and second planar members have stable states to which they return when being bent out of its respective stable state to a limited extent. Further, the first planar member is in its stable state when the entire bar element is in the first stable state and the second planar member is in its stable state when the bar element is in the second stable state.

Furthermore, it is preferred that the divider device comprises a flexible web-shaped cover material which encloses the bar elements. Firstly, the cover material can form the hinge portions which interconnect adjacent bar elements and allows a pivoting movement between adjacent bar elements. Secondly, the cover material can be adapted to form a projection screen or to give the entire divider device the desired appearance.

In particular, the cover material may form pockets which extend in parallel to each other wherein the bar elements are received in the pockets. Such a configuration is easy to manufacture and assembly and allows to change single bar elements which are defective, in a simple manner.

In a further preferred embodiment of the present disclosure, the divider device comprises a support element, which may be formed as a portion of the aircraft cabin ceiling or a hatrack portion, and one of the plurality of bar elements is pivotably connected to the support element. In addition, the support element comprises a magnet element that is arranged adjacent to one end of the bar elements and applies an attracting force to the ends of the bar elements. This ensures that in the collapsed state of the divider device the stack of bar elements is kept in the folded position by an additional force.

Finally, it is also conceivable that the bar elements are formed of shape-memory material, wherein the first stable state of the bar elements corresponds to a least one permanent form of the bar elements. This allows that the forces which result in a bending of the bar elements into the curved shape or the first stable state, can be activated only when it is really required, i.e. when the divider device is to be transformed from the expanded state to the collapsed state. This can be achieved by providing a stimulus such as heat or an electric pulse to the shape-memory material so that it tends to assume its permanent form which corresponds to the first stable state.

In particular, it is also conceivable that the above-mentioned first and second planar members are formed of shape memory material wherein in the first stable state the first planar member is in a permanent form and wherein in the second stable state the second planar element is in a permanent form. Such a structure allows to facilitate the transformation in both directions from the expanded state to the collapsed state and vice versa. When the divider device is in the expanded state and it is intended to fold it into the collapsed state, a stimulus such as heat or an electric pulse is provided to the first planar members of the bar elements. This results in a force which bends the bar elements towards the curved shape corresponding to the first stable position. In turn, when the divider device is in the collapsed state and it is intended to unfold it, a stimulus is provided to the second planar members so that the bar elements are transformed into the second stable state corresponding to a linear shape. When the bar elements have this shape and the divider device is suspended on a ceiling portion, the device will automatically unfold. Thus, by remotely triggering the stimulus, it is possible to initiate the transformation from the collapsed to the expanded state of such a divider device.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIGS. 4A-B illustrate perspective cross sectional views of the embodiment of the divider device in the collapsed and expanded states, FIGS. 5A-B illustrate plane views of the embodiment of the divider device in the collapsed and expanded states, FIG. 6 illustrates a perspective view of the embodiment of the divider device in the collapsed state.

DETAILED DESCRIPTION

Figure 1:
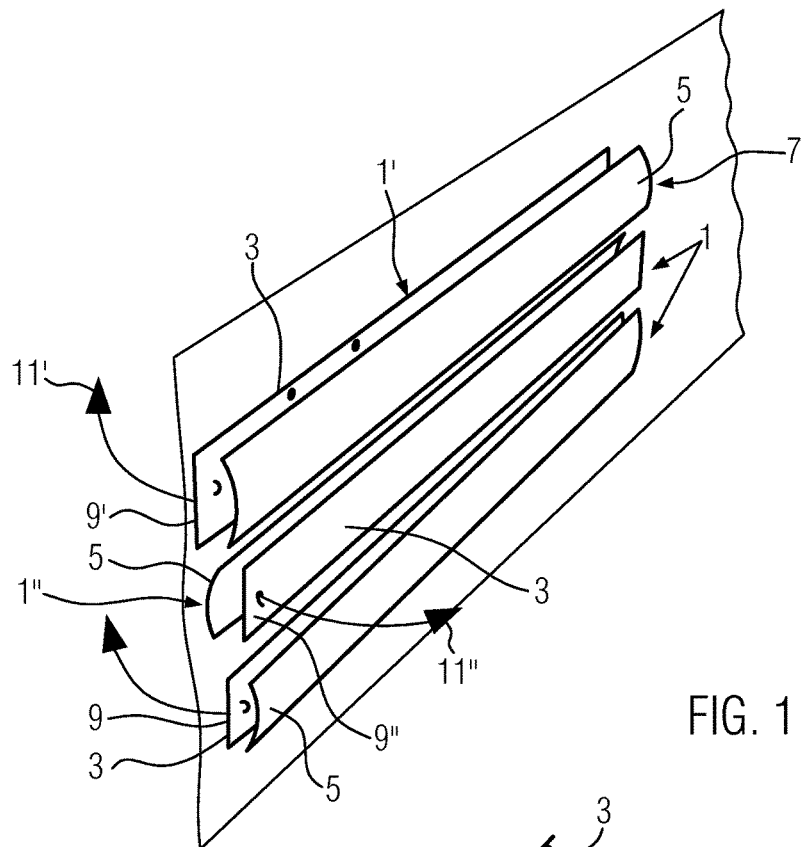
FIG. 1 illustrates a perspective view of bar elements of a preferred embodiment of an aircraft cabin divider device according to the present disclosure.
Figure 2A:
FIGS. 2A-D illustrate different states of a bar element shown in FIG. 1, FIGS. 3A-B illustrate perspective views of the receptacle element of the embodiment of the divider device.
Figure 2B:
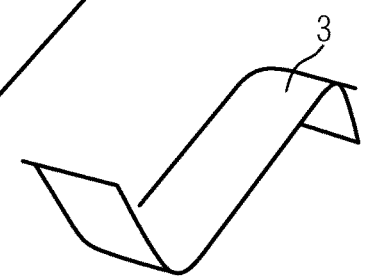
Figure 2C:
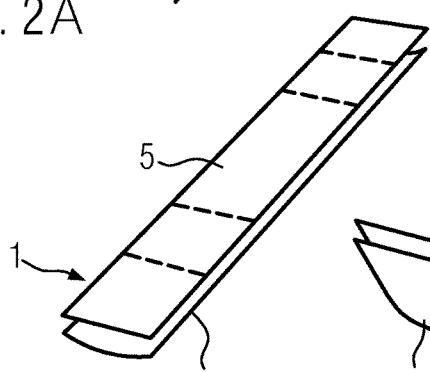
Figure 2D:
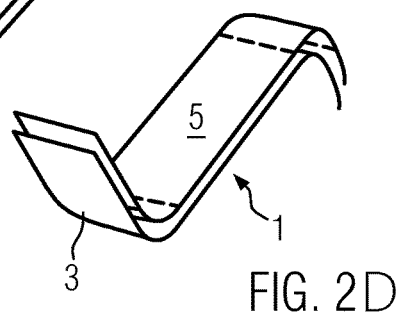

The preferred embodiment of a divider device according to the present disclosure as shown in the drawing comprises three planar elongate bar elements 1 which are flexible and may assume a linear state which is shown in FIG. 1. In the linear state the bar elements 1 extend rectilinearly in a plane, i.e. the direction of extension of the bar elements 1 follows a straight line and is not curved. Further, in this preferred embodiment each bar element 1 comprises first and second planar elements 3, 5 which are arranged in parallel and on top of each other and are formed of spring steel.

The bar elements 1 are configured such that they have first and second stable states as will be discussed in the following.

In Part a) and b) of FIG. 2 the first planar member 3 is shown in two different states. The first planar member 3 has a stable state (shown in Part b) of FIG. 2) to which it returns when being bent out of this stable state to a limited extent. In the stable state the first planar member 3 has a curved shape, i.e. is S-shaped, and does not extend in a plane compared to the linear state shown in the Part a) of FIG. 2. Further, when the first planar member 3 is not actively maintained in the linear shape shown in Part a) of FIG. 2, it immediately returns to the curved stable state of Part b).

The lower portion of FIG. 2 shows the entire bar element 1 comprising the planar members 3, 5 in the first stable state (Part d)) and the second stable state (Part c)), the latter being defined by the second planar member 5. When the second planar member 5 has a rectilinear shape, i.e. extends along a straight line, it is in its stable state to which it returns when being bent out of this state to a limited extent.

Thus, the first planar member 3 is initially rolled such that is has the shape shown in Part b) of FIG. 2, whereas the second planar member 5 was originally formed to a shape shown in Part c) of FIG. 2.

In the first stable state of the bar elements 1, they have a curved shape as shown in Part d) of FIG. 2, and when the entire bar elements 1 are bent out of this shape to a limited extent far away from the linear state shown in Part c) of FIG. 2, the bar elements 1 will return to the curved shape and the first stable state, respectively, as the first planar member 3 provides for a corresponding force or bias.

In addition, the bar elements 1 have a second stable state shown in Part c) of FIG. 2 which corresponds to a linear shape so that the bar elements 1 extend along a straight line in a plane. As also the linear shape of the bar elements 1 constitutes a stable state, the bar elements 1 will return to the linear shape, when slightly being bent due to a force generated by the second planar member 5. Thus, the bar elements 1 have the tendency to maintain its linear shape once being brought into.

However, when the entire bar elements 1 are actively bent to a predetermined extent out of the linear shape towards the curved shape defining the first stable state by applying an external force, the bar elements 1 will automatically transform into the curved shape due to the force created by the first planar member 3.

Thus, in the bar elements 1 of this preferred embodiment the first planar member 3 is in its stable state when the entire bar element 1 is in the first stable state, and the second planar member 5 is in its stable state when the bar element 1 is in the second stable state.

Moreover, as shown in FIGS. 1 and 4, the bar elements 1 are arranged side-by-side, and adjacent bar elements 1 are pivotably interconnected with each other, so that when the bar elements 1 are in the linear state or second stable state, their longitudinal axes extend in parallel.

In addition, each pair of first and second adjacent bar elements 1', 1" are designed such that when the first and the second bar elements 1', 1" are in the linear state or second stable state so that they extend in a common plane 7, in the first stable state of the first bar element 1' one end 9' thereof will be positioned on a first side of the plane 7 as indicated by the arrow 11' extending from the end 9' of the first bar element 1'. Instead, in the first stable state of the second bar element 1" its end 9"' corresponding to the end 9' of the first bar element 1' will be located on a second side of the plane 7 opposite to the first side which is shown by the arrow 11" starting from the respective end 9" of the second bar element 1". Thus, in the divider element the bar elements 1 are arranged in an alternating manner so that in the first stable state distal ends 9', 9" of adjacent bar elements 1', 1" are arranged on opposite sides of the plane 7 defined by the unfolded divider element. This means that adjacent bar elements 1', 1" tend to bend to opposite sides of the plane 7 when each of the bar elements 1 of the device is entirely positioned in that common plane 7.

As shown in FIGS. 3 and 4, the divider device comprises a receptacle element 13 formed of flexible web-shaped material, and the receptacle element 13 is provided with elongate pockets 15 for receiving the bar elements 1 in a side-by-side configuration so that when the bar elements 1 are in the linear state, the longitudinal axes of the bar elements 1 are arranged in parallel. The material of the receptacle element 13 can be chosen such that the divider device may also be effective as a projection screen and/or symbols may be printed on the receptacle element 13. Finally, due to the flexibility of the material of the receptacle element 13, adjacent bar elements 1 are pivotably interconnected.

The divider device comprises a support element 17 which can be connected to or being part of a hatrack 19 of an aircraft cabin, the receptacle element 13 being pivotably connected with the support element 17. Further, the support element 17 comprises a magnet element 21 adjacent to end portions of the bar elements 1 so that an attracting force is applied to the bar elements 1 by the magnet element 21.

The divider device as described before can be used as follows.

Figure 7:
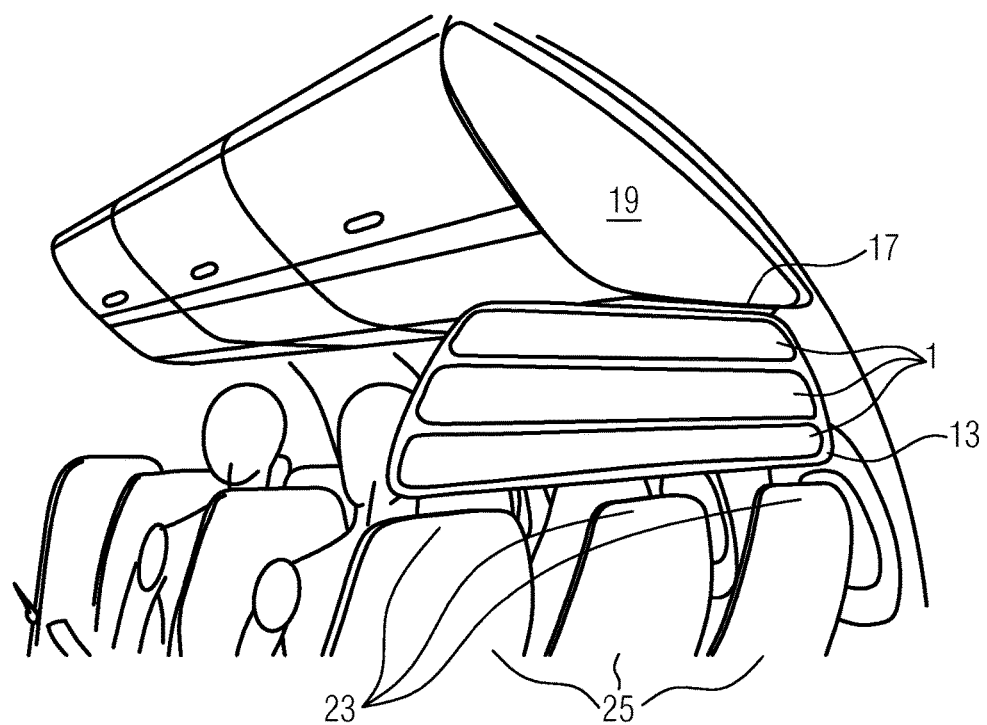
FIG. 7 illustrates a perspective view of the embodiment of the divider device in the expanded state.

In the use condition or the expanded state of the divider device (see Part b) of FIGS. 4 and 5 as well as FIG. 7) the receptacle element 13 is suspended on the support element 17 such that the receptacle element 13 with the bar elements 1 extends vertically from the hatrack 19 towards the headrest portions 23 of passenger seats 25 in an aircraft cabin and is effective as a screening element. In this configuration the bar elements 1 are in the second stable state which corresponds to a linear shape. This stable state is obtained because the second planar members 3 are in their respective stable state.

When a free view through the entire cabin is required, the bar elements 1 are folded on top of each other by alternately pivoting the bar elements 1 to the right and to the left starting at the free end close to the headrest portions 23 (see Part a) of FIGS. 4 and 5 as well as FIG. 6).

When the resulting stack of bar elements 1 is bent to a predetermined extent to one side of a plane parallel to which the bar elements 1 extend when being in the linear state, the stack automatically assumes a curved or S-shaped state, since the first stable state of each of the bar elements 1 is on that side of such a plane. In this curved state it can follow the cross section of the hatrack 19. Further, due this curved shape the stack cannot easily be unfolded without an external force, as the connecting lines forming a hinge in the receptacle element 13 between adjacent bar elements 1, are no longer straight.

Thus, when the divider device is folded from the expanded straight vertical position into a stack, this stack will automatically assume a curved shape and remains in the folded or collapsed state, unless an external force is applied which bends the entire stack into a linear shape. Further, the stack is maintained in the collapsed state due to the attracting force on the end portions of the bar elements 1 applied by the magnet element 21 in the support element 17.

When it is intended that the divider element is used as a screening element again, the cabin crew has to unfold it by first bending it back to the linear state.

Finally, it is possible that the bar elements 1 are formed of shape-memory material. Then, the first stable state of the bar elements 1 corresponds to a least one permanent form of the bar elements 1. This allows that the forces which lead to a bending of the bar elements 1 to the curved shape or the first stable state, can be selectively activated only, when it is really required, i.e. when the divider device is to be transformed from the expanded to the collapsed state. This can be achieved by providing a stimulus such as heat or an electric pulse to the shape-memory material of the bar elements 1 so that it tends to assume its permanent form which corresponds to the first stable state.

In particular, it is also conceivable that the above-mentioned first and second planar members 3, 5 are formed of shape memory material wherein in the first stable state the first planar member 3 is in a permanent form and in the second stable state the second planar element 5 is in a permanent form.

Such a structure facilitates the transformation both from the expanded state to the collapsed state and vice versa. When the divider device is in the expanded state and it is intended to fold it into the collapsed state, a stimulus such as heat or an electric pulse is provided to the first planar members 3 of the bar elements 1. This results in a force which bends the bar elements 1 towards the curved shape corresponding to the first stable state.

In turn, when the divider device is already in the collapsed state and it is intended to unfold it, a stimulus is provided to the second planar members 5, so that the bar elements 1 are transformed into the second stable state corresponding to a linear shape. When the bar elements 1 have this shape and the divider device is suspended on the hatrack 19 via the support element 17, the device will automatically unfold. Thus, by remotely triggering the stimulus, it is possible to initiate the transformation from the collapsed to the expanded state of such a divider device.

In conclusion, the divider device according to the present disclosure is easy to handle, as the cabin crew has only to bend the stack of interconnected bar elements 1 form a curved into a linear shape to obtain the expanded vertical position of the divider device in which it is effective as screening element. In turn, to obtain the collapsed state, it is only required to fold the bar elements 1 on top of each other towards the support element 17 of the hatrack 19 and bend the stack slightly towards the hatrack 19.

Finally, as the bar elements 1 are formed of flexible material, the entire divider device cannot transfer high loads corresponding to the entire weight of a passenger to the respective support element 17 on the hatrack, when being grasped by a passenger. Instead, different from rigid divider elements such as curtains with a stable guide rail, the divider device of the present disclosure will deform to a large extent under such loads and the entire load will not be transferred to the support element 17.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A divider device for an aircraft cabin, comprising:
   a plurality of elongate bar elements,
   wherein each bar element is planar and flexible so that it may assume a linear state in which it extends rectilinearly along a longitudinal axis parallel to a plane;
   wherein each bar element has a first stable state in which it is curved, so that it deforms into its first stable state when being bent out of the linear state towards the stable state to a predetermined extent;
   wherein the bar elements are arranged side-by-side and adjacent bar elements are pivotably interconnected with each other, so that when the bar elements are in the linear state, their longitudinal axes extend in parallel; and
   wherein adjacent bar elements are arranged such that when the bar elements are in the linear state and extend in a common plane, an end of a first adjacent bar element in the first stable state is positioned on a first side of the common plane whereas a corresponding first end of a second adjacent bar element in the first stable state is located on a second side of the common plane opposite the first side.

2. The divider device according to claim 1, wherein the linear state of the bar elements forms a second stable state so that when one of the bar elements is bent out of the linear state to an extent smaller than the predetermined extent, it returns to the linear state.

3. The divider device according to claim 1, wherein a support element is provided to which one of the plurality of bar elements is pivotably connected, and
   wherein the support element comprises a magnet element that is arranged adjacent to one end of the bar elements and applies an attracting force to the ends of the bar elements.

4. The divider device according to claim 1, wherein the bar elements are formed of spring steel.

5. The divider device according to claim 1, wherein the bar elements are formed of shape-memory material, and
   wherein the first stable state of the bar elements corresponds to a least one permanent form of the bar elements.

6. The divider device according to claim 1, wherein the bar elements comprise first and second planar members which are arranged on top of each other.

7. The divider device according to claim 6, wherein the first planar member has a stable state to which it returns when being bent out of its stable state to a limited extent,
   wherein the second planar member has a stable state to which it returns when being bent out of its stable state to a limited extent,
   wherein the first planar member is in its stable state when the bar element is in the first stable state and wherein the second planar member is in its stable state when the bar element is in the second stable state.

8. The divider device according to claim 7, wherein the first and second planar members are formed of shape memory material,
   wherein in the first stable state the first planar member is in a permanent form thereof, and
   wherein in the second stable state the second planar element is in a permanent form thereof.

9. The divider device according to claim 1, comprising a flexible web-shaped cover material enclosing the bar elements.

10. The divider device according to claim 9, wherein the cover material forms pockets which extend in parallel to each other, and
    wherein the bar elements are received in the pockets.

* * * * *